(12) United States Patent
Bendel

(10) Patent No.: US 12,516,557 B2
(45) Date of Patent: Jan. 6, 2026

(54) METHOD AND DEVICE FOR CONTROLLING AT LEAST ONE MOTOR-VEHICLE CLOSURE ELEMENT

(71) Applicant: Kiekert AG, Heiligenhaus (DE)

(72) Inventor: Thorsten Bendel, Oberhausen (DE)

(73) Assignee: Kiekert AG, Heiligenhaus (DE)

( * ) Notice: Subject to any disclaimer, the term of this patent is extended or adjusted under 35 U.S.C. 154(b) by 34 days.

(21) Appl. No.: 18/250,763

(22) PCT Filed: Oct. 15, 2021

(86) PCT No.: PCT/DE2021/100830
§ 371 (c)(1),
(2) Date: Apr. 27, 2023

(87) PCT Pub. No.: WO2022/100780
PCT Pub. Date: May 19, 2022

(65) Prior Publication Data
US 2023/0383579 A1     Nov. 30, 2023

(30) Foreign Application Priority Data

Nov. 12, 2020   (DE) ............... 10 2020 129 844.7

(51) Int. Cl.
*E05B 81/78*   (2014.01)
*E05F 15/73*   (2015.01)
*E05F 15/77*   (2015.01)

(52) U.S. Cl.
CPC ............ *E05B 81/78* (2013.01); *E05F 15/73* (2015.01); *E05F 15/77* (2015.01); *E05Y 2400/858* (2013.01); *E05Y 2900/531* (2013.01)

(58) Field of Classification Search
CPC .......... E05B 81/78; E05F 15/73; E05F 15/77; E05F 15/76; E05Y 2400/858;
(Continued)

(56) References Cited

U.S. PATENT DOCUMENTS 10,380,817 B2 *   8/2019   Kim ............... G07C 9/00309
2017/0103592 A1 *  4/2017   Buttolo ............... G07C 9/21
(Continued)

FOREIGN PATENT DOCUMENTS

DE         10106400 A1    8/2002
DE     102013225600 A1    9/2014
(Continued)

OTHER PUBLICATIONS

International Search Report mailed Mar. 25, 2022, for priority International Patent Application No. PCT/DE2021/100830.

*Primary Examiner* — Rufus C Point
(74) *Attorney, Agent, or Firm* — Renner, Otto, Boisselle & Sklar, LLP

(57) ABSTRACT

A method for controlling at least one motor-vehicle closure element, more particularly a motor-vehicle door. A personal transmitting unit is sensed by at least one closure-element receiving unit. According to the invention, the personal transmitting unit is located by means of at least two spatially distanced closure element-side receiving units and is evaluated in accordance with its relative position and/or velocity in comparison with the motor-vehicle closure element.

11 Claims, 2 Drawing Sheets

(58) Field of Classification Search
CPC ........ E05Y 2900/531; E05Y 2400/852; G07C 9/00309; G07C 2209/63; G07C 9/00563; G07C 2009/00793
See application file for complete search history.

(56) References Cited

U.S. PATENT DOCUMENTS

| | | | | |
|---|---|---|---|---|
| 2018/0118163 A1* | 5/2018 | Murakami | ............ | B60R 25/01 |
| 2020/0014099 A1* | 1/2020 | Ghabra | .................... | G01S 3/48 |
| 2020/0070725 A1* | 3/2020 | Ding | ...................... | B60R 99/00 |

FOREIGN PATENT DOCUMENTS

| | | | |
|---|---|---|---|
| DE | 102017220299 A1 | | 5/2018 |
| DE | 102017204078 A1 | | 9/2018 |
| EP | 1733937 B1 | | 8/2008 |
| JP | 2009127336 A | * | 6/2009 |
| WO | 2014064297 A1 | | 5/2014 |

* cited by examiner

METHOD AND DEVICE FOR CONTROLLING AT LEAST ONE MOTOR-VEHICLE CLOSURE ELEMENT

This application is a national phase of International Patent Application No. PCT/DE2021/100830 filed Oct. 15, 2021, which claims priority to German Patent Application No. 10 2020 129 844.7 filed Nov. 12, 2020, each of which is hereby incorporated herein by reference in its entirety.

FIELD OF DISCLOSURE

The invention relates to a method for controlling at least one motor-vehicle closure element, in particular a motor-vehicle door, according to which a personal transmitting unit is detected by at least one closure-element receiving unit.

BACKGROUND OF DISCLOSURE

The personal transmitting unit can generally also be a combined transmitting/receiving unit. As a rule, so-called radio keys are used at this point, with the help of which a motor-vehicle user willing to enter can open the associated motor-vehicle or its motor-vehicle closure element. This is done either by a corresponding radio command from the closure-element receiving unit or simply by the user in question moving within the receiving range of the closure-element receiving unit together with the personal transmitting unit they are carrying. The closure-element receiving unit can also be a transmitting/receiving unit.

Typically, this is followed by a so-called question/answer dialog, which results, for example, in individual or all motor-vehicle closure elements being issued or even opened in the event of a positive authorization check. Opening the motor-vehicle closure element generally means that the motor-vehicle closure element in question is opened and, due to a pressure built up by a rubber seal, a gap opens between the motor-vehicle closure element and an associated motor-vehicle body through which, for example, the motor-vehicle closure element can be grasped by the user with one hand and then opened manually. In principle, it is also possible for the motor-vehicle closure element in question to be opened fully or partially with the aid of a servomotor, for example.

In case of the genus-forming prior art according to EP 1 733 937 B1, the personal transmitting unit is a code transmitter. In addition, a transmitting/receiving unit is provided in the motor vehicle, which is equipped with an antenna. The motor-vehicle closure element is then automatically opened when the portable code transmitter authorized to access the motor vehicle is within the electrical field strength range of the antenna and also performs a predeterminable change in position.

DE 10 2017 204 078 A1, which is also generic, deals with a method for controlling at least one motor-vehicle closure element. Also in this case, a mobile identification transmitter or personal transmitting unit is detected in a determined access area around the vehicle. A user signal is also output to the person. After the mobile identification transmitter or the personal transmitting unit has remained in place for a predetermined period of time, the at least one motor-vehicle closure element is unlocked and/or opened.

The prior art has proven itself in principle, but still offers room for improvement. Thus, with the known gauges, there is a general problem that the opening of the motor-vehicle closure element following the authorization check of the user and the other criteria described above ignores the current traffic situation. This means that in practice, situations can arise in which the motor-vehicle closure element is opened and a cyclist approaching from behind, for example, does not notice this or does not notice it in time and collides with the opening motor-vehicle closure element. Comparable things are also possible and can happen in practice when the motor-vehicle closure element in question is closed. This is where the invention comes in.

SUMMARY OF DISCLOSURE

The invention is based on the technical problem of further developing such a method and an associated device in such a manner that collisions with (uninvolved) road users are avoided as reliably as possible.

To solve this technical problem, a generic method for controlling at least one motor-vehicle closure element within the scope of the invention is characterized in that two locally spaced closure-element receiving units are used to target the personal transmitting unit and to evaluate it as a function of its relative position and/or speed in comparison with the motor-vehicle closure element.

According to the invention, it is therefore expressly not a matter of detecting, for example, a specific dwell time of a person carrying the personal transmitting unit for a specific time, as DE 10 2017 204 078 A1 specifies. Also, any change in position suggested by EP 1 733 937 B1 is not decisive. Rather, according to the invention, the personal transmitting unit is first detected not only by one closure-element receiving unit, but by two locally spaced closure-element receiving units. This allows a receiving angle to be determined using the two closure-element receiving units. This receiving angle can be used to infer the exact relative position of the personal transmitting unit compared to the associated motor-vehicle closure element. Depending on the relative position of the transmitter unit to the motor-vehicle closure element, an evaluation is performed in such a manner that the relevant or another motor-vehicle closure element is actuated. The procedure is usually that the two closure-element receiving units, which are locally spaced apart from one another, each belong to a separate motor-vehicle closure element. In principle, however, the two closure-element receiving units can also be arranged on one and the same motor-vehicle closure element.

In any case, the exact relative position of the personal transmitting unit can be deduced from the angle measurement with the aid of the two locally spaced closure-element receiving units. This relative position can be determined not only in relation to the two motor-vehicle closure elements or the one motor-vehicle closure element, but also in general in comparison to the motor vehicle or its motor vehicle body.

This makes it possible to determine whether the personal transmitting unit is located in an area where a collision with an opening motor-vehicle closure element can occur, for example. In this context, it is usually the case that the personal transmitting unit is portable and designed as a code transmitter equipped with an authorization check.

In general, the personal transmitting unit can also be any transmitter or transmitting unit that is regularly carried by a person. This can be a cell phone, a wristwatch with a transmitting function, etc. According to the invention, this makes it possible to detect practically all the transmitting units in the vicinity of the motor vehicle that are linked to persons with the aid of the two closure-element receiving units. In this manner, the position of such persons located in the near field of the motor vehicle and/or their speed can be detected and evaluated for controlling the relevant motor-vehicle closure element. For example, if a personal transmitting unit (any person with a cell phone) is on a collision course with an opening motor-vehicle closure element, the relative position or velocity of the personal transmitting unit in question may cause the motor-vehicle closure element in question either not to open at all or to open only partially. In principle, it is even possible and conceivable to interrupt an opening process of the motor-vehicle closure element or a closing process triggered by this.

As a rule, however, it is primarily personal transmitting units that are evaluated with the aid of the two locally spaced closure-element receiving units, which are the code transmitters already mentioned, i.e. those personal transmitting units that are worn by an operator with access authorization and are equipped with an authorization check.

It is further possible to proceed in such a manner that the relative position of the personal transmitting unit is evaluated several times with the aid of the two closure-element receiving units for deriving a trajectory or a track curve or the path of the person concerned. With the help of this trajectory, it is practically possible to define a velocity vector of the personal transmitting unit, which indicates both direction and velocity of the personal transmitting unit and thus overall of the person in question. Different actions can then be derived from this direction and speed of the approaching person (this is usually an authorized user). Typically, one or more motor-vehicle closure elements are actuated depending on the direction of the trajectory and/or speed of the personal transmitting unit. For example, it is conceivable that by evaluating the trajectory and/or speed of the personal transmitting unit, an expected movement of the person concerned to the driver's side or passenger side of the associated motor vehicle is derived. As a result, both motor-vehicle side doors on the driver's side or passenger side can then be opened or opened, for example. Of course, it is also possible for only the motor vehicle driver's door or only the motor vehicle passenger door to be opened.

Either way, the actuated motor-vehicle closure element is typically opened and/or decelerated and/or closed. That is, depending on the evaluation of the direction of the trajectory and/or the speed of the personal transmitting unit, the previously described and different scenarios for the motor-vehicle closure element can be mapped. The motor-vehicle closure element is usually opened by an opening drive. The motor-vehicle closure element is usually a motor-vehicle door and particularly a motor-vehicle side door. In general, however, the motor-vehicle closure element can also be designed as a motor-vehicle tailgate, motor-vehicle sliding door, motor-vehicle front hood, or even a motor-vehicle fuel filler cap. In any case, different scenarios for the movement of the motor-vehicle closure element concerned can be derived from the trajectory and/or speed of the personal transmitting unit, namely in the sense of opening and/or decelerating and/or closing.

In this context, the motor-vehicle closure element is usually opened first and then opened again. That is, if the evaluation of the direction of the trajectory and/or speed of the personal transmitting unit results in controlling one or more motor-vehicle closure elements, this initially results in the relevant motor-vehicle closure element being issued. This opening corresponds to the gap-wise opening described above.

Complete opening regularly occurs only when the personal transmitting unit is in an access area of the motor-vehicle closure element for a predetermined period of time. Here, the invention assumes that the presence of the user carrying the personal transmitting unit in an access area of the motor-vehicle closure element within the predetermined time period corresponds to the fact that the user in question wants to enter the motor vehicle via the relevant motor-vehicle closure element or the motor-vehicle door. The access area of the motor-vehicle closure element means the spatial area through which access through the motor-vehicle closure element into the interior of the motor vehicle is possible after it has been opened.

For example, in the case of a motor-vehicle side door adjacent to the motor-vehicle body, the access area is located starting at the end of the motor-vehicle side door and extending, for example, to the hinge of a further motor-vehicle side door on this side or to the rear area of the motor vehicle concerned. In this case, the predetermined time period can typically be several seconds, for example, 1 second, 2 seconds, but typically 3 seconds or more, up to a maximum of 10 seconds, 20 seconds, or 30 seconds.

This ensures that the motor-vehicle closure element in question or the motor-vehicle side door in the example case is not fully opened until and only when the user willing to enter is located in the access area. As a result, the motor vehicle side door in question is effectively covered to the rear, avoiding any collisions with a cyclist approaching from behind. At the same time, collisions from the front are also practically ruled out because a cyclist approaching from the front perceives the person located in the access area of the motor-vehicle closure element in question as an obstacle and swerves accordingly, meaning that the motor-vehicle side door opening in front of the access area also does not collide with the cyclist in the example case described.

In principle, the design can further be made in such a manner that the motor vehicle adjusting element can be controlled not only by a signal from the two closure-element receiving units, but also by person-related signals. Examples of person-related signals include voice signals from the person or access-willing user, gestures, etc. Such voice signals are usually used for other purposes via microphones already present in or on the motor vehicle and a regularly implemented voice control system, but according to the invention and by way of example they can also be used for controlling the motor vehicle adjusting element. In addition, sensors can be conceived in or on the motor vehicle, with the help of which the user's gestures can be detected and evaluated for controlling the motor-vehicle adjusting element.

It is also a subject matter of the invention to provide a device for controlling at least one motor-vehicle closure element as described in claim 10. The said device is particularly suitable for performing the method already described in detail above. As a result, a method and a device are made available which provide controlling of a motor-vehicle closure element and in particular of a motor-vehicle door, wherein in a simple manner not only, for example, opening movements of the motor-vehicle door in question are initiated by remote control, as it were, but this is done overall in such a manner that during this process hazards to other road users such as, for example, cyclists or also pedestrians are reliably avoided.

This is achieved by detecting the exact relative position of the approaching person or the user who is willing and authorized to enter the vehicle in relation to the motor-vehicle closure element in question. Only when the person in question is in the access area of the motor-vehicle closure element is a full opening permitted, meaning that through this specific constellation between the user in question and the opening motor-vehicle closure element, the user simultaneously assumes a kind of warning function or acts like an obstacle for any approaching cyclists. This allows to perfectly and reliably avoid collisions with cyclists but also generally pedestrians or other road users. In addition, this also prevents a collision with the (access-willing) user. Herein lie the essential advantages.

BRIEF DESCRIPTION OF DRAWINGS

The invention is explained in greater detail below with reference to drawings which show only one exemplary embodiment. In the drawings.

DETAILED DESCRIPTION

Figure 1:
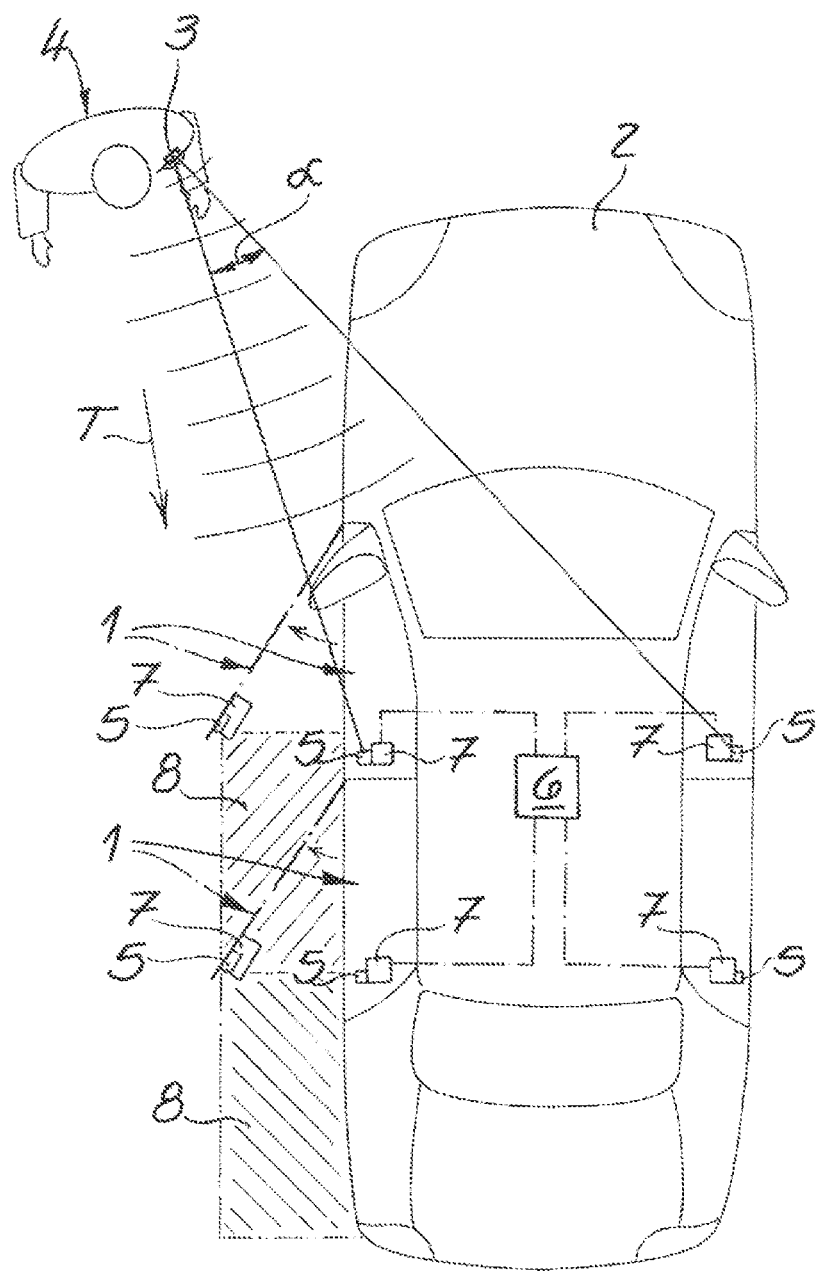
FIG. 1 shows a device according to the invention for controlling at least one motor-vehicle closure element.
Figure 2:
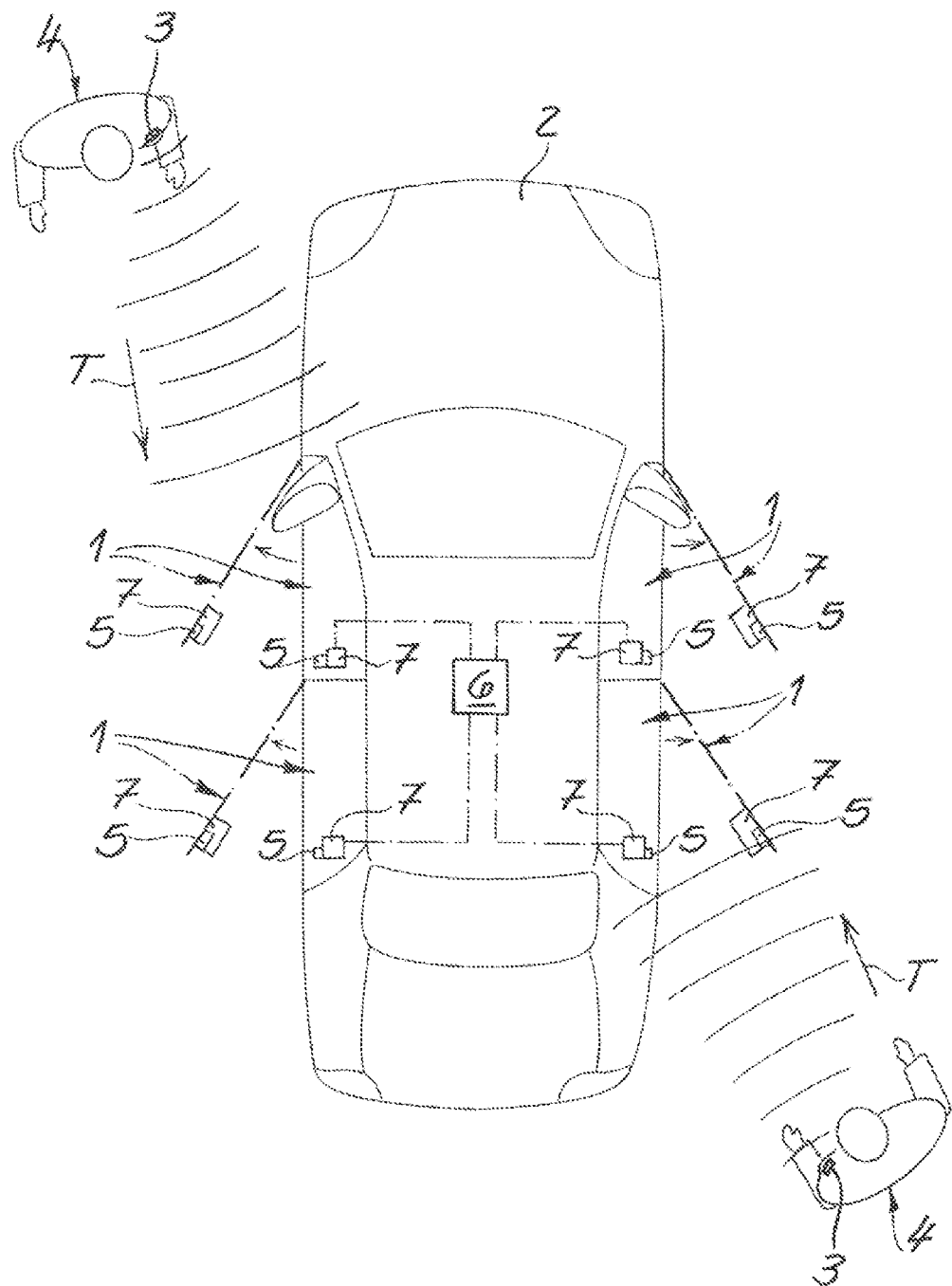
FIG. 2 shows a section of the device according to FIG. 1 in a modified functional position.

The figures show a device for controlling at least one motor-vehicle closure element 1. In fact, FIG. 1 shows a motor-vehicle body 2 which, according to the exemplary embodiment, is equipped with a total of four motor-vehicle closure elements 1 in the form of motor-vehicle doors or motor-vehicle side doors 1 in each case. Furthermore, the basic structure includes a personal transmitting unit 3, which, according to the exemplary embodiment and not restrictively, is a portable personal transmitting unit 3 in the form of a code transmitter 3 equipped with an authorization check.

This means that between the code transmitter 3, which is carried by a user 4, and the motor-vehicle body 2, an authorization check takes place when the user 4 approaches the motor-vehicle body 2 to determine whether the user 4 carrying the code transmitter 3 is authorized to enter or not. For this purpose, the motor-vehicle body 2 has a corresponding receiving unit 5 which, according to the exemplary embodiment, is or can be arranged on the motor-vehicle closure element 1 or the motor-vehicle side door 1 or also inside it. In general, the authorization check can also be performed by data exchange between the code transmitter 3 and a further receiving unit installed on the body side and not shown.

Either way, the personal transmitting unit or the code transmitter 3 is detected by the at least one closure-element receiving unit 5. According to the exemplary embodiment, each of the total of four different motor-vehicle closure elements or motor-vehicle side doors 1 has its own closure-element receiving unit 5.

According to the invention, the personal transmitting unit 3 is now targeted with the aid of at least two locally spaced closure-element receiving units 5. As a function of the relative position of the transmitting unit 3 and/or its speed in comparison to the motor-vehicle closure element 1, an evaluation now takes place. In fact, according to the exemplary embodiment, a total of four different closure-element receiving units 5 are implemented, namely one on each individual motor-vehicle closure element or motor-vehicle side door 1. The fact that the motor-vehicle closure elements or motor-vehicle side doors 1 are spaced apart from one another in terms of location also results in an angle or receiving angle α which is produced by the fact that the personal transmitting unit 3 can be aimed at by the at least two closure-element receiving units 5 which are spaced apart from one another in terms of location. As a result, the relative position of the personal transmitting unit 3 can be detected not only easily by means of the two closure-element receiving units 5. But this relative position can also be determined several times, resulting in a trajectory T or track curve. This trajectory T can be used to map the direction of movement of person 4 and, if necessary, their speed.

Depending on the direction of the trajectory T and/or the speed of the personal transmitting unit 3 and thus of the associated person 4, one or more motor-vehicle closure elements 1 can now be actuated. From FIG. 1, it can be seen that the person 4 in question, and with him the personal transmitting unit 3, is approaching the left drivers side of the motor vehicle or motor vehicle body 2. As a result, this approach or the trajectory T can now be evaluated to the effect that both closure elements 1 arranged on the left side of the vehicle in question are activated as a result. The controlling of the motor-vehicle closure elements 1 can thereby generally be effected in such a manner that the relevant motor-vehicle closure element 1 is opened and/or decelerated and/or closed. For this purpose, each of the individual motor-vehicle closure elements 1 is equipped with an associated servomotor for opening and also for closing. A deceleration unit is also provided, with the aid of which the motor-vehicle closure element or the motor-vehicle side door 1 can be decelerated in the example case.

The overall procedure is such that the motor-vehicle closure element 1, which is actuated after evaluation of the personal transmitting unit 3 by the two locally spaced closure-element receiving units 5 or an associated and indicated control unit 6, is first opened and only then opened. That is, the control unit 6 in question first evaluates the signals from the individual closure-element receiving units 5. As a function of this, the trajectory T of the transmitting unit 3 and thus of the person 4 and/or their speed can then be determined. As a function of this, the control unit 6 decides which one or more of the individual motor-vehicle closure elements 1 are to be actuated.

This controlling thus provides that the motor-vehicle closure element 1 in question is initially issued. In the example case considered, this applies to the two motor-vehicle side doors 1 on the left side of the vehicle. In the example case, the opening means that associated motor vehicle latches 7 are controlled and unlocked as well as opened by the control unit 6. As a result, the motor-vehicle closure element 1 in question moves slightly relative to the body 2 as a result of spring forces built up by circumferential rubber seals, exposing a gap through which the person or user 4 can subsequently open the motor-vehicle side door 1 in question if required. Of course, the opening movement can also be supported by a so-called opener, as described in the prior art according to DE 10 2017 204 078 A1.

According to the invention, the motor-vehicle closure element or the motor-vehicle side door 1 in the example case is not fully opened until the personal transmitting unit 3 is located in an access area 8 of the associated motor-vehicle closure element 1 for a predetermined period of time. In this case, the access area 8 defines a space or area adjacent to the rear end of the associated motor-vehicle closure element 1 up to the next motor-vehicle closure element 1 on the same side of the motor vehicle or up to the rear of the motor-vehicle body 2. Within this access area 8, the access-willing person 4 can reach the interior of the motor-vehicle body 2 as soon as the associated motor-vehicle closure element or motor-vehicle side door 1 in the example case is opened. At the same time, the presence of the person 4 in the access area 8 ensures that a cyclist approaching from behind or from the front, for example, is made aware of the person as an obstacle.

Only when the person 4 is in the access area (8) in question within the predetermined time period is the motor-vehicle closure element or motor-vehicle side door 1 in question, or the two motor-vehicle side doors 1 in the example case, opened. The time period can be several seconds from 1 second, at least 3 seconds up to 5 or even 10 seconds, depending on how fast the opening of the motor-vehicle closure element 1 occurs or should occur.

Since the access-willing user or person 4 is located in the access area 8 of the motor-vehicle closure element 1 during the opening of the motor-vehicle closure element 1, the person 4 can also intervene in the movement of the motor-vehicle closure element 1 if necessary. This means that the motor-vehicle closure element is not only controlled by a signal from the two closure-element receiving units 5 or the control unit 6 that evaluates their signals, but can also be influenced by personal signals. These personal signals may be voice signals, gestures, etc. This allows the person or user 4 to intervene if the motor-vehicle closure element 1 opens too quickly, for example, or to close it to avoid a collision with a cyclist. This reliably ensures that no cyclist can drive into the open motor vehicle side door. This is because the person 4 acts as a visual obstacle in front of the opening, thereby preventing any collisions.

REFERENCE SIGNS 1. motor-vehicle closure element, —side door
2. vehicle body
3. code transmitter, transmitting unit
4. person
5. receiving unit
6. control unit
7. Motor vehicle latches
8. access area

The invention claimed is:

1. A method for controlling at least one motor-vehicle closure element comprising the steps of:
   spacing apart at least two locally spaced closure-element receiving units,
   aiming a personal transmitting unit in a direction of the at least two locally spaced closure-element receiving units,
   detecting the personal transmitting unit by at least one closure-element receiving unit of the at least two locally spaced closure-element receiving units,
   based on detecting the personal transmitting unit, evaluating a position of the personal transmitting unit as a function of relative position and/or speed of the personal transmitting unit in comparison with the motor-vehicle closure element, and
   actuating the at least one motor-vehicle closure element based on the evaluated position of the transmitting unit to move the at least one motor-vehicle closure element relative to a vehicle body to generate a gap between the at least one closure element and the vehicle body,
   wherein the actuated motor-vehicle closure element is initially issued and is subsequently fully opened when the personal transmitting unit is located in an access area of the motor-vehicle closure element for a predetermined period of time,
   wherein the access area of the motor-vehicle closure element is directly adjacent the motor-vehicle closure element and is a spatial area for access into an interior of the motor vehicle after the motor-vehicle closure element is opened, and
   wherein the predetermined period of time depends on how fast the opening of the motor-vehicle closure element occurs.

2. The method according to claim 1, further comprising determining a receiving angle of a signal from the personal transmitting unit relative to the two locally spaced closure-element receiving units and inferring the relative position of the personal transmitting unit based on the receiving angle.

3. The method according to claim 1, wherein the two locally spaced closure-element receiving units each belongs to a separate motor-vehicle closure element.

4. The method according to claim 1, wherein the relative position of the personal transmitting unit is evaluated several times with the two locally spaced closure-element receiving units to derive a trajectory of the personal transmitting unit.

5. The method according to claim 1, further comprising actuating the motor-vehicle closure element based on detecting a personal signal in addition to detecting a signal by the two locally spaced closure-element receiving units.

6. The method according to claim 5, wherein the personal signal comprises a voice signal and/or a gesture.

7. A device for controlling at least one motor-vehicle closure element that performs the method according to claim 1, the device comprising:
   a personal transmitting unit which can be detected by at least one closure-element receiving unit, and
   two locally spaced closure-element receiving units including the at least one closure-element receiving unit that take the bearing of the personal transmitting unit, wherein a relative position and/or speed of the personal transmitting unit is evaluated in comparison with the motor-vehicle closure element.

8. The device according to claim 7, wherein the personal transmitting unit is a portable electronic device and comprises a code transmitter subject to an authorization check.

9. The device according to claim 7, further comprising a sensor for detecting a personal signal of a user of the device.

10. The method according to claim 1, further comprising transmitting a code with the personal transmitting unit and performing an authorization check of the code.

11. The method according to claim 1, further comprising detecting more than one personal transmitting unit by the at least one closure-element receiving unit of the at least two locally spaced closure-element receiving units, and
   evaluating a position of each of the more than one personal transmitting unit as a function of relative position and/or speed of each of the more than personal transmitting unit in comparison with the motor-vehicle closure element.

* * * * *